(12) United States Patent
Krygler et al.

(10) Patent No.: US 7,463,167 B2
(45) Date of Patent: Dec. 9, 2008

(54) ELECTRONIC PARKING CONTROL DEVICE, SYSTEM AND METHOD FOR THIS

(76) Inventors: Agenor Krygler, Gruzinska 4, PL-03-902, Warschau (PL); Alicja Krygler, Gruzinska 4, PL-03-902, Warschau (PL)

( * ) Notice: Subject to any disclaimer, the term of this patent is extended or adjusted under 35 U.S.C. 154(b) by 581 days.

(21) Appl. No.: 10/869,312

(22) Filed: Jun. 16, 2004

(65) Prior Publication Data

US 2005/0171687 A1 Aug. 4, 2005

(30) Foreign Application Priority Data

Feb. 4, 2004 (PL) ........................................ 365484

(51) Int. Cl.
*G07C 1/30* (2006.01)
*G07F 17/24* (2006.01)
(52) U.S. Cl. .................... 340/932.2; 705/418; 194/217; 368/90; 825/28; 825/36; 825/46
(58) Field of Classification Search .................... 368/6, 368/7, 10, 69, 194; 702/176; 40/333; 194/900, 194/902
See application file for complete search history.

(56) References Cited

U.S. PATENT DOCUMENTS

| | | | | |
|---|---|---|---|---|
| 4,460,965 A | * | 7/1984 | Trehn et al. | 705/418 |
| 4,717,815 A | * | 1/1988 | Tomer | 235/378 |
| 4,730,285 A | * | 3/1988 | Lie | 368/90 |
| 4,847,776 A | * | 7/1989 | Huang | 705/418 |
| 5,166,680 A | * | 11/1992 | Ganot | 340/932.2 |
| 5,241,162 A | * | 8/1993 | Ilie et al. | 235/384 |
| 6,188,328 B1 | * | 2/2001 | Ho | 340/932.2 |
| 6,373,401 B2 | * | 4/2002 | Ho | 340/932.2 |
| 2003/0163434 A1 | * | 8/2003 | Barends | 705/418 |
| 2003/0227827 A1 | * | 12/2003 | Elizalde et al. | 368/109 |
| 2005/0010478 A1 | * | 1/2005 | Gravelle | 705/16 |
| 2006/0129500 A1 | * | 6/2006 | Mandy et al. | 705/65 |

FOREIGN PATENT DOCUMENTS

| | | | | |
|---|---|---|---|---|
| EP | 325302 A2 | * | 7/1989 |
| EP | 959436 A1 | * | 11/1999 |
| EP | 1126418 A1 | * | 8/2001 |
| GB | 2185137 A | * | 7/1987 |
| GB | 2202068 A | * | 9/1988 |
| GB | 2284919 A | * | 6/1995 |
| WO | WO 9114239 A1 | * | 9/1991 |
| WO | WO 9319435 A1 | * | 9/1993 |

OTHER PUBLICATIONS

"Piaf Personal Parking Meter", 1994 Smart Card News Ltd, Jul. 1994, p. 140.*

* cited by examiner

*Primary Examiner*—Thomas G. Black
*Assistant Examiner*—Lin B Olsen
(74) *Attorney, Agent, or Firm*—Friedrich Kueffner

(57) ABSTRACT

An electronic parking control device for displaying a parking time of vehicles should be easy to operate. This is achieved by a mobile electronic display device (10) which can be positioned in the vehicle and which is configured chargeable my means of a charging device (11) by electronic signals which correspond to parking time units.

11 Claims, 3 Drawing Sheets

ELECTRONIC PARKING CONTROL DEVICE, SYSTEM AND METHOD FOR THIS

TECHNICAL FIELD

This invention relates to a parking control device, a charging device, a system as well as a method according to the preamble of the corresponding independent claim.

BACKGROUND OF THE INVENTION

It is known to install a central parking ticket issuing machine on parking areas. A parking ticket can be bought there which indicates the valid parking time corresponding to the parking fees paid at the issuing machine. The parking ticket is put behind the windshield of the vehicle.

Such parking ticket issuing machines are relatively sensitive. They can easily be destroyed by rowdies and it can easily come to a defect of their relatively complicated and expensive electronics. A printer integrated in the device is susceptible to defects as well.

The parking ticket must be placed so as to be easily visible behind the windshield, for example by strong wind it can fly away before it is put against the windshield or even in the vehicle it can easily or unintentionally fall down, which leads to an unwanted fine.

At least the reading of the parking time is time consuming for a public officer since the exact parking time must always be read.

Parking meters which can be installed in the open are known as well, whereby an own parking meter does exist for each parking space. This solution without parking ticket issuing machine is losing ground since such a solution is relatively expensive due to the multitude of parking meters which have to have a solid construction.

SUMMARY OF THE INVENTION

Thus, the aim of the invention is to create a parking control device of the generic type or to find solutions for which an easy manipulation is possible for the parking space user as well as for a public officer or another attendant.

This aim is achieved by the characterizing characteristics of the independent claims in connection with their preamble characteristics.

Due to the mobile electronic device according to the invention which can be positioned in the vehicle, a printed parking ticket is no longer necessary. This device offers a greater ease of operation, all the more since according to the invention it is configured chargeable by electronic signals which correspond to parking time units by means of a charging device. Compared to the parking ticket, it can always be reused. Electronics for the display device as well as for the charging device can consist of very simple circuits which are far less susceptible to defects. This solution is practically maintenance free.

The display device must be placed so as to be very easily visible and is easy to be loaded preferably by a parking time credit, in particular if, according to an advantageous improvement of the invention, a signal transmitting element exists on the one hand in the charging device and, on the other hand, in the mobile display device, in such a manner that a transmission of the electronic signals which define the parking time unit is possible. The credit must not be completely used by a single parking space use, which is good. A credit which has not been yet used can be used another time.

Appropriately the display device (parkbox) has at least one switching element for charging and/or spending the parking time units.

According to a further preferred embodiment of the display device according to the invention, it is provided that the mobile display device comprises a display or a control field for controlling the parking time credit and/or a spent parking time. The status of the device can easily be controlled by an attendant or by the parking person personally.

It is very advantageous if the mobile display device is equipped with an optical signal element, in particular a flashing diode which indicates that a parking time is being spent. Whit this advantageous measure, an attendant saves very much time for the parking space control since no numerical values must be read. If the diode flashes, everything is in order. If it does not flash, there is no credit so that a caution is due.

For a simple solution easy to operate, it is provided that the signal element as well as a parking time consumption element is manually activable. This can be carried out with a simple switch or key button. A deactivation with this switch or key button is naturally advantageous.

In order to obtain a counting or a subtraction from the credit, the mobile display device is provided with a counter, namely to count the parking time units spent which are debited from the credit.

For the practical manipulation, it is ideal if the mobile display device has a box-type casing, in particular if it is configured as a parkbox which can be mounted behind a windshield, whereby the casing has preferably a casing upper side inclined with respect to a casing bottom, in particular in such a manner that a display field can be seen from an outer side of a windshield. The safe placing behind the windshield is easy. The device can easily be transported and can quickly be seen by the attendant or the like, in particular for example because of flashing red diodes.

In order to be able to carry out a charging of the mobile display device, the charging device is appropriately provided with at least one signal transmitting element for the transmission of the electronic signals. In particular if, according to a further improvement, a loading shaft and/or a receiver guide for receiving the mobile display device is provided for. The signal transmitting element arrives through the guide and due to a simple manual plug-in movement of the mobile device into the preferably fixed charger or into the charging device. Thus, the manipulation of the system according to the invention takes place simply and easily.

According to an advantageous measure, either each signal transmitting element of the mobile display device on the one hand and of the charging device on the other hand is preferably configured as plug contact, or—alternatively—each signal transmitting element can also be configured as contactless transmitting element for, in paricular infrared, radio signals, transponder signals and/or ultrasonic signals.

In order to avoid efficiently an unintentional manipulation of the devices and thus free parking or parking at low cost, for example through a forbidden manipulation of a clock frequency or by a forbidden free charging from home by means of a PC, it is judicious to extend the system according to the invention by a coding system for encoding a parking credit and/or a consumption.

Thus, according to a further advantageous improvement of the parking system according to the invention, each charging device is equipped with an electronic encoding device and each mobile display device with a decoding device so that no trickery is possible.

For a further advantageous option which is important for the pratical use, each mobile display device and each charging device is equipped with an energy storage, in particular a battery or an accumulator, which comprises an energy capacity for a current supply of at least 5 years, in particular approximately 7 to 8 years.

The mobile display device causes, when activated, a consumption of the credit according to the used parking time.

However, an installation of the charging device in gasoline stations or supermarkets can easily be carried out. In this manner, a surface covering sales network can quickly be realized, comparable with that of mobile radiotelephone cards. The charging device can also be configured as a machine, for example with parking time credit cards which have to be inserted into the display device.

Further advantageous configurations of the invention are characterized in the subclaims.

BRIEF DESCRIPTION OF THE DRAWINGS

An embodiment of the invention will be explained in detail with reference to the drawings.

DETAILED DESCRIPTION OF THE PREFERRED EMBODIMENTS OF THE INVENTION

Figure 1:
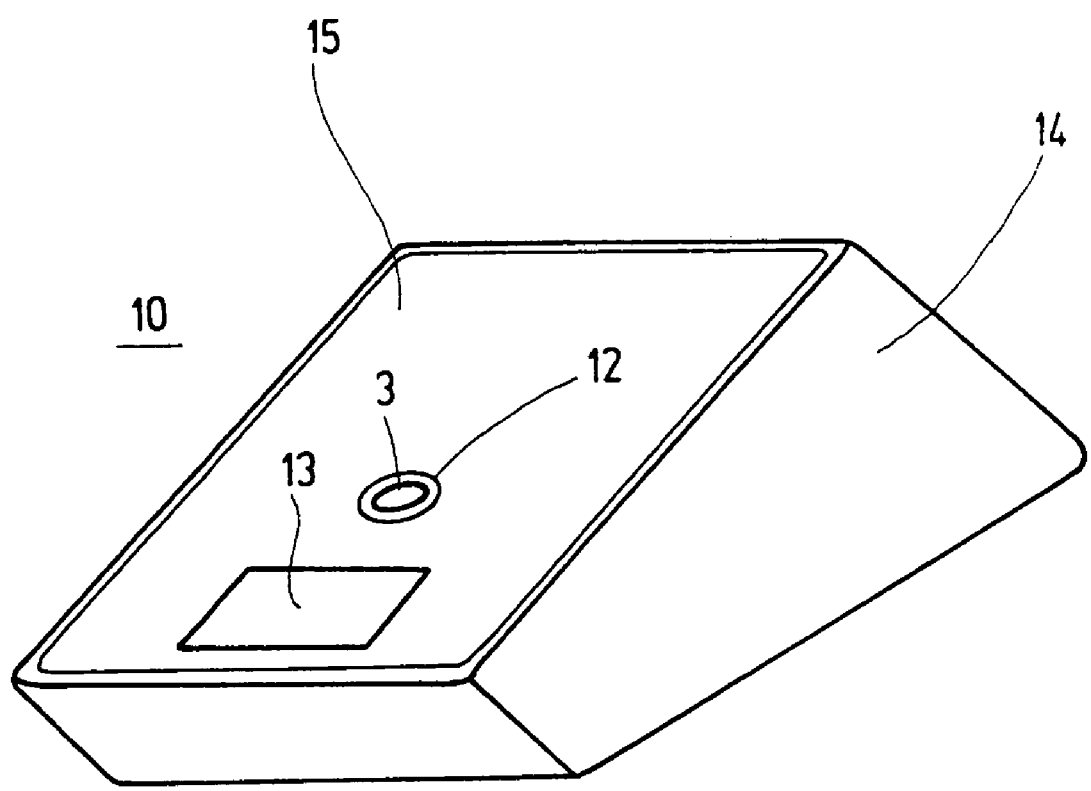
FIG. 1 is a perspective representation of a display device according to the invention.

FIG. 1 illustrates a mobile electronic display device 10 which can be positioned in a vehicle which is configured, according to the invention, chargeable by means of a charging device 11 represented in FIG. 1 by electronic signals which correspond to parking time units. The display device 10 with its charging device 11 serves for the electronic parking control or for controlling a parking time of vehicles. Preferably a credit, for example 10 hours parking time, is loaded onto the display device 10 with the charging device 11.

As FIG. 1 shows, the mobile display device 10 is configured with an optical signal element 12, in particular with a flashing diode 3, which indicates that a parking time is being debited from the credit.

The flashing diode 3 indicates that a consumption element, in particular a counter 2, is activated which is shown later in detail in FIG. 3. It is and/or the counter is preferably manually activated.

Alternatively, the signal element as well as the counter 2 for the parking time can be automatically activated, in particular when a parking position is reached or when entering a parking area, in particular a parking garage.

The mobile display device 10 possesses a control or indicating field 13 for the control in particular of the parking time credit and/or of a parking time spent from the integrated account.

The mobile display device 10 has a box-type casing 14, preferably a compact casing 14 which can be easily mounted behind a windshield, as a so-called parkbox in the passenger compartment. As shown in FIG. 1, the casing 14 has a casing upper side 15 inclined to a casing bottom. The upper side is configured in such a manner that the display field 13 is easily visible from an outer side of a windshield.

In a preferred solution, for safety reasons, it is provided for that a destruct device with a destruct component is installed in the mobile display device 10, this destruct device causing an electrical and/or mechanical destruction when opening the box so that no manipulation is possible.

Figure 2:
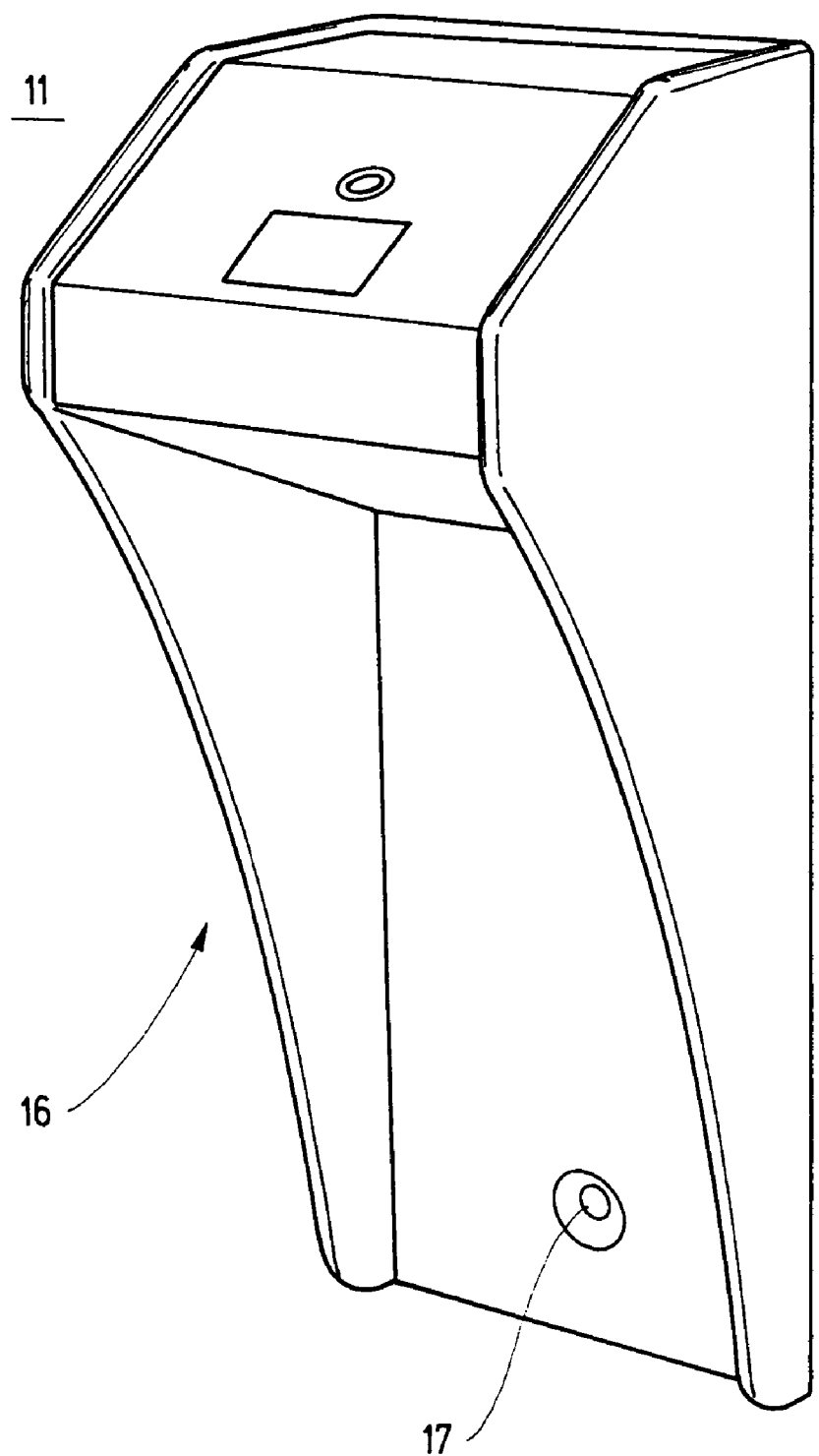
FIG. 2 is a perspective representation of a charging device according to the invention for the display device shown in FIG. 1.

FIG. 2 illustrates a charging device 11 or a charger for the display device 10 or the parkbox. The charging device is configured compact und has small dimensions so that it can be easily installed. For example, it is 7 cm wide at the most and/or 20 cm high at the most and/or 7.5 cm deep. The parkbox itself is still much smaller. The casing as well as the electronics should be so robust and so stable that an usable life of at least 7 years is achieved. The device should be maintenance free within this time. The casing is made of plastics, of a metallic material or of another appropriate material.

One or several fixing bore holes 17 for the wall installation are advantageous.

The charging device 11 is equipped with a loading shaft and/or a receiver guide 16 for receiving the mobile display device. At least one signal transmitting element 7 exists at the end of the receiver guide 16, this element constituting an interface for the display device 10, whereby a further signal transmitting element 8 is provided on the display device 10, as shown in FIG. 3.

The signal transmitting element of the mobile display device 10 on the one hand and the charging device 11 on the other hand can be configured as contact elements, preferably as plug contacts.

It is also possible that the signal transmitting elements 7, 8 are configured as contactless transmitting elements for, in particular infrared, radio, magnetic field signals, in particular transponder signals and/or ultrasonic signals.

In particular the signal transmitting elements 7, 8 are directly integrated into the mobile display device 10 as switches for the transmission of time units of the charging device 11. They can be configured as contact switches or as contactless switches.

An encoding system 5 or an electronic encoding device for the encoding of the signals defining a parking credit and/or a consumption exists on the charging device 5. This system is connected on the one hand with a first counter 6 on the charging device. The counter 6 counts the parking time units wished by the user of the parkbox which should be charged or which the user wants to buy.

On the other hand, the encoding system 5 is connected with the signal transmitting element 7 or with the switch or contact for a signal transmission to the parkbox.

For decoding these signals, a decoding system 1 or an electronic decoding device 1 is integrated into the mobile display device 10 in order to decrypt the encrypted signals. this device 1 is connected with the transmitting element 8 at its input while an output is connected with a switching element 4, preferably a circuit breaker. This switching element is connected itself with a second counter 2. Appropriately, the counter 2 counts time units in minutes when the parkbox is activated. The counting of the counter 2 can take place as down counting so that it can be seen how the credit is getting less due to parking. The display device 10 practically clears time units which are spent in the course of the parking time.

Figure 3:
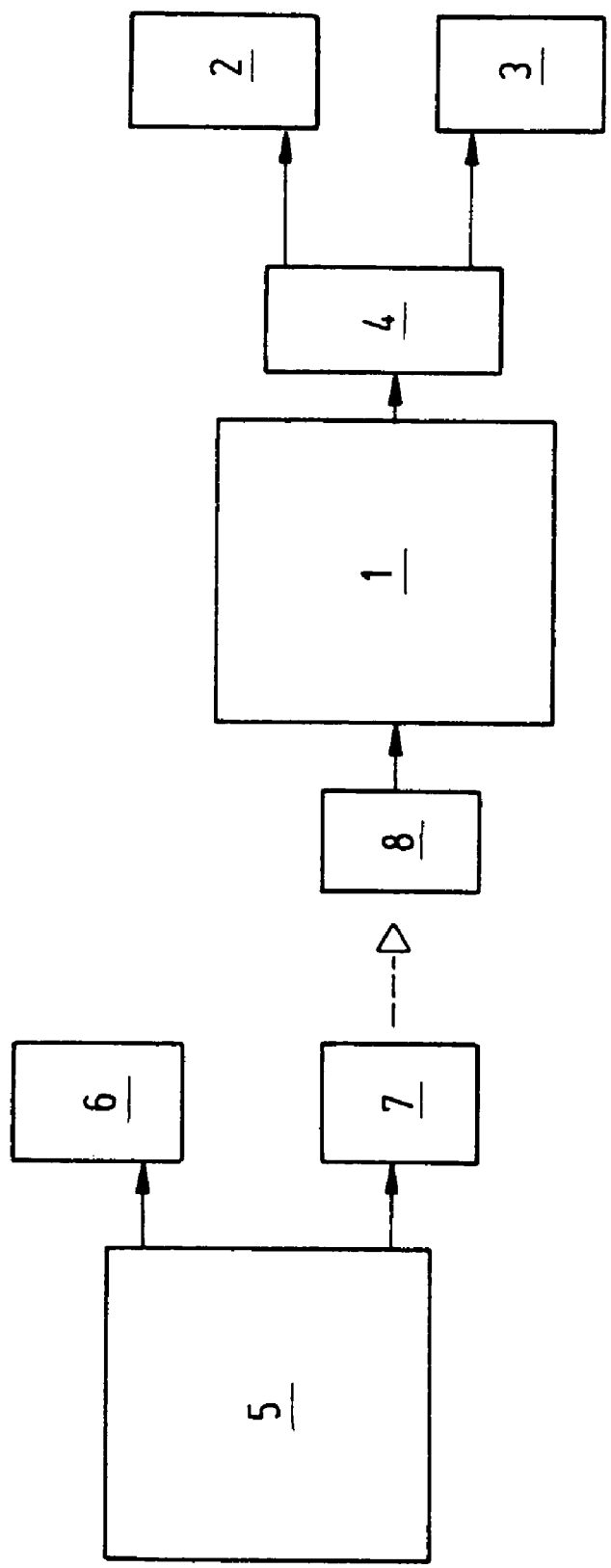
FIG. 3 is a block diagram for a system consisting of display device and charging device.

As FIG. 3 shows, the switching element 4 is connected with the diode 3 which flashes when the box is activated.

The described system can be used independently from existing systems.

LIST OF REFERENCE NUMERALS

1 Decoding system
2 Counter (display device)
3 Diode

4 Switching element
5 Endoding system
6 Counter (charging device)
7 First signal transmitting element
8 Second signal transmitting element
9 -
10 Display device
11 Charging device
12 Signal element
13 Display field
14 Casing
15 Casing upper side
16 Receiver guide
17 Fixing bore holes

The invention claimed is:

1. Electronic parking control device for displaying a parking time of vehicles, the electronic parking control device comprising a mobile electronic display device (10) which can be positioned in the vehicle and which is configured chargeable by means of a charging device (11) by electronic signals which correspond to parking time units, wherein the charging device having a load shaft and/or a receiver guide (16) for receiving the mobile display device (10), wherein a first signal transmitting element exists in the charging device (11) and a second signal transmitting element exists in the mobile display device (10), in such a manner that a transmission of the electronic signals which define the parking time unit is possible, and further wherein the charging device has an encoding system (5) for encoding the signals defining a parking credit and/or a consumption, wherein the mobile display device (10) has a box-type casing (14) configured as a park-box mountable behind a windshield, whereby the casing (14) has a casing upper side (15) inclined with respect to a casing bottom, such that the upper side (15) can be seen from an outer side of a windshield.

2. Electronic parking control device according to claim 1, wherein the second signal transmitting element (8) as well as a consumption element of the parking time can be activated manually.

3. Electronic parking control device according to claim 1, wherein the display device (10) has at least one switching element for charging or spending the parking time units.

4. Electronic parking control device according to claim 1, wherein the mobile display device (10) comprises a display field (13) for controlling the parking time credit, a spent parking time, or a parking time credit or a spent parking time.

5. Electronic parking control device according to claim 1, wherein the mobile display device (10) is provided with a counter (2) to count the parking time units spent.

6. Electronic parking control device according to claim 1, wherein the mobile display device (10) is equipped with an optical signal element (12), in particular a flashing diode (3) which indicates that a parking time is being spent.

7. System comprising at least one electronic parking control device comprising a mobile electronic display device (10) which can be positioned in the vehicle and which is configured chargeable by means of a charging device (11) by electronic signals which correspond to parking time units, wherein the charging device having a load shaft and/or a receiver guide (16) for receiving the mobile display device (10), wherein a first signal transmitting element exists in the charging device (11) and a second signal transmitting element exists in the mobile display device (10), in such a manner that a transmission of the electronic signals which define the parking time unit is possible, and further wherein the charging device has an encoding system (5) for encoding the signals defining a parking credit and/or a consumption, wherein each signal transmitting element of the mobile display device and the charging device is configured as a contact element.

8. System according to claim 7, and further comprising an encoding system (7, 8) for encoding the signals defining a parking credit, consumption, or parking credit and consumption.

9. System according to claim 7, wherein each charging device (11) comprises an electronic encoding device (1, 5) and each mobile display device (10) an decoding device (1).

10. System according to claim 7, wherein each mobile display device (10), each charging device (11), or each mobile display device and each charging device is equipped with an energy storage, in particular a battery or an accumulator, which comprises an energy capacity for a current supply of at least 5 years, in particular approximately 7 to 8 years.

11. System according to claim 7, wherein the contact element is a plug contact.

\* \* \* \* \*